US006808341B2

United States Patent
Lai et al.

(10) Patent No.: US 6,808,341 B2
(45) Date of Patent: Oct. 26, 2004

(54) PNEUMATIC EDGE TRIMMING MACHINE

(75) Inventors: Bao Shyan Lai, Taichung (TW); Chung-Tsun Cho, Taichung (TW)

(73) Assignee: Nailermate Enterprise Corp., Tali (TW)

( * ) Notice: Subject to any disclaimer, the term of this patent is extended or adjusted under 35 U.S.C. 154(b) by 517 days.

(21) Appl. No.: 09/866,992

(22) Filed: May 29, 2001

(65) Prior Publication Data

US 2002/0182023 A1 Dec. 5, 2002

(51) Int. Cl.[7] .............................. B23C 5/02; B27G 71/00
(52) U.S. Cl. .............. 409/134; 144/136.95; 144/252.1; 409/137; 451/456
(58) Field of Search ................................ 409/134, 137, 409/182; 451/451, 456; 144/252.1, 154.5, 136.95; 408/241.6

(56) References Cited

U.S. PATENT DOCUMENTS

| 4,051,880 A | * | 10/1977 | Hestily | 144/154.5 |
| 4,245,437 A | * | 1/1981 | Marton | 451/456 |
| 4,422,239 A | * | 12/1983 | Maier et al. | 30/124 |
| 4,742,855 A | * | 5/1988 | Hartley | 144/154.5 |
| 4,957,148 A | * | 9/1990 | Shoda | 144/252.1 |
| 5,152,327 A | * | 10/1992 | Shoda | 144/252.1 |
| 5,370,165 A | * | 12/1994 | Stornetta | 144/136.95 |
| 6,146,066 A | * | 11/2000 | Yelton | 144/252.1 |

FOREIGN PATENT DOCUMENTS

JP 11-58323 * 3/1999 ............. 409/134

* cited by examiner

Primary Examiner—William Briggs
(74) Attorney, Agent, or Firm—Charles E. Baxley

(57) ABSTRACT

A pneumatic edge trimming machine has a base a center of which having a hole. A sleeve extends upwards from the base for receiving a hollow outer casing. The outer casing has a top and a lower end; and the top and lower end of the outer casing are fixed to an inner casing through a frame. A space penetrating the inner casing and outer casing is formed. The inner casing is used to be installed with a pneumatic motor. A shaft is extended from a pneumatic motor. The shaft has a tool combining portion which exposes out of the hole at the base. The inner casing has an air inlet and a control switch. The inner casing has a vent facing toward a top of the outer casing, and the top of the outer casing being connected to a predetermined space by a tube. Therefore dust can be absorbed automatically in working.

5 Claims, 6 Drawing Sheets

US 6,808,341 B2

PNEUMATIC EDGE TRIMMING MACHINE

FIELD OF THE INVENTION

The present invention relates to a pneumatic edge trimming machine, and especially to a pneumatic edge trimming machine which can absorb dust in working.

BACKGROUND OF THE INVENTION

Referring to FIGS. 5 and 6, a prior art electric edge trimming machine is illustrated. A base 9 is installed with a motor 91. A shaft of the motor 91 protrudes downwards to be connected to a cutting knife 92. A trench 93 is formed in the base 9. One end of the trench 93 is connected to be near the knife 92, while another end is connected to a tube 94 extending from the base 9. The tube 94 is utilized to be connected with a soft tube 95 of a dust absorber (not shown), so that as the knife 92 cuts a work piece, the dust can be absorbed by absorber and then flows through the trench 93, tube 94, and soft tube 95 to be absorbed to the absorber.

Referring to FIG. 6, a schematic cross sectional view of a prior art electric edge trimming machine is illustrated. Since the knife 92 protrudes from the bottom of the base 9 for trimming in cutting. The trench 93 is positioned to the base 9. Therefore from the position for cutting a work piece by the knife 92 to the opening of the trench 93 are bent with 90 degrees and the trench 93 to the tube 94 are bent through 90 degrees to enter into the soft tube 95 of the dust absorber. Furthermore, the dust accumulator is installed at a farther place, and is connected to the tube 94 through a soft tube 95, the absorbing force thereof is reduced at the bending portions in the flowing path. Therefore the effect of dust absorption is not preferred.

Moreover, the dust absorber must be bought additionally. It is not a fitting of the electric edge trimming machine, and thus, the cost is high.

The rotary speed of the motor 91 of an electric edge trimming machine is high. If the working piece is a large load and heat dissipation is bad in cutting, it is very possible that the rotor of the motor 91 will be burnt out or other parts have faults. Furthermore, the electric edge trimming machine has a high cost.

SUMMARY OF THE INVENTION

Accordingly, the primary object of the present invention is to provide a pneumatic edge trimming machine, wherein the periphery of the inner casing has via holes facing upwards. Since the place generating an absorbing force is relative near the work piece of the knife, the dust is strongly absorbed. The flow from the work piece of the knife to the tube through the inner casing and outer casing are smooth. Therefore the effect of absorbing dust automatically is high.

The various objects and advantages of the present invention will be more readily understood from the following detailed description when read in conjunction with the appended drawing.

DETAILED DESCRIPTION OF THE PREFERRED EMBODIMENTS

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
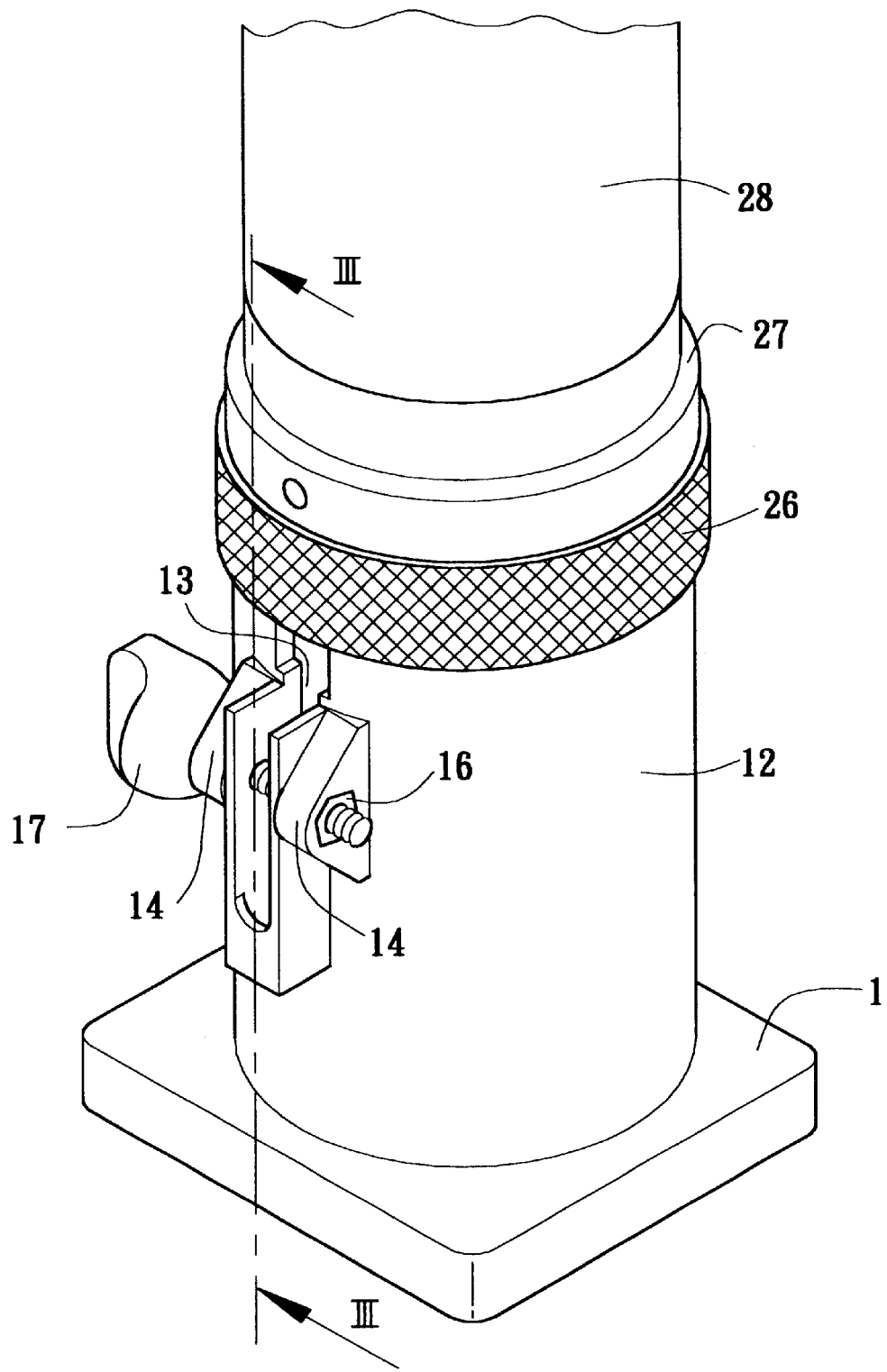
FIG. 1 is a perspective view of the present invention.
Figure 2:
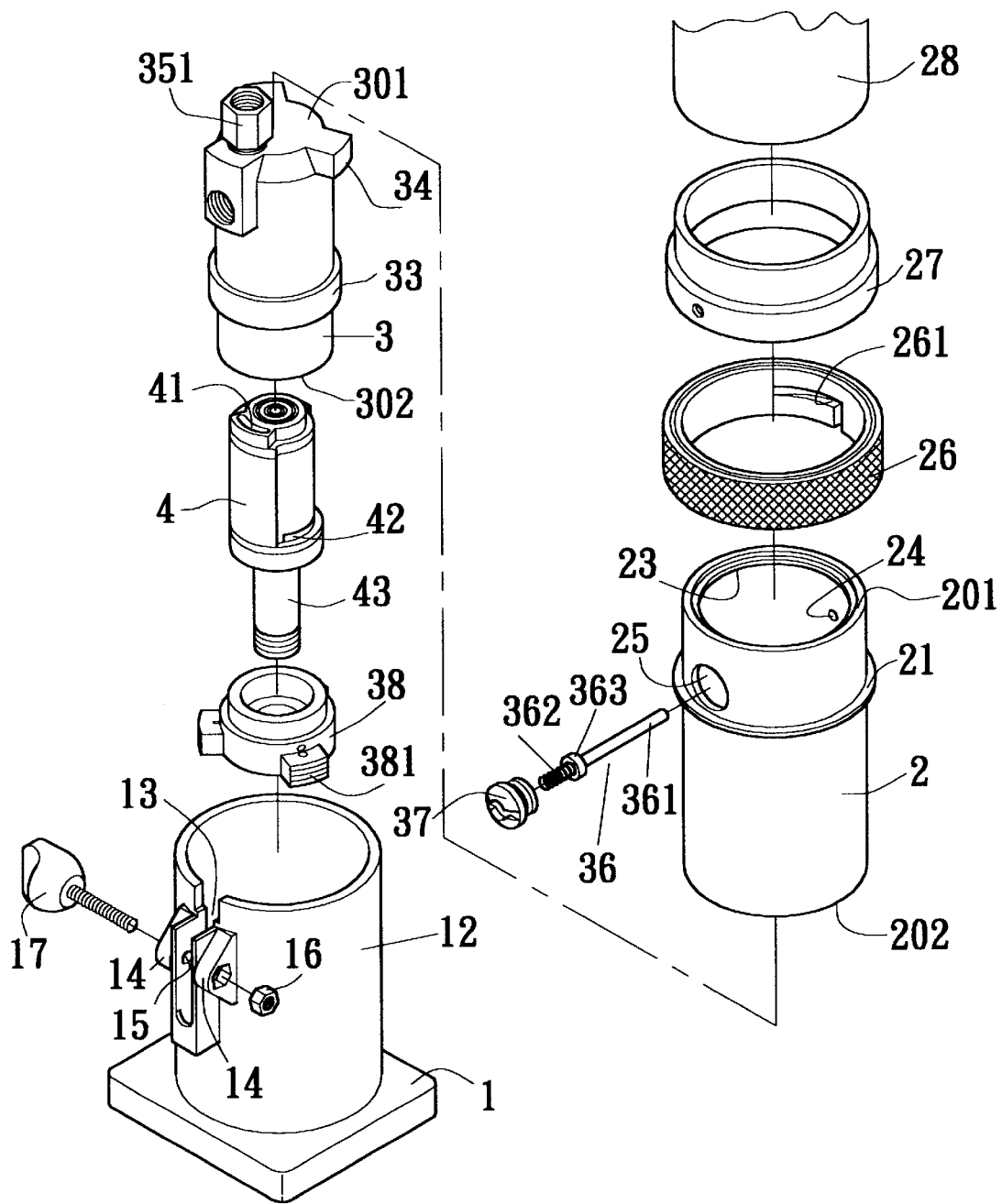
FIG. 2 is an exploded perspective view of the present invention.
Figure 3:
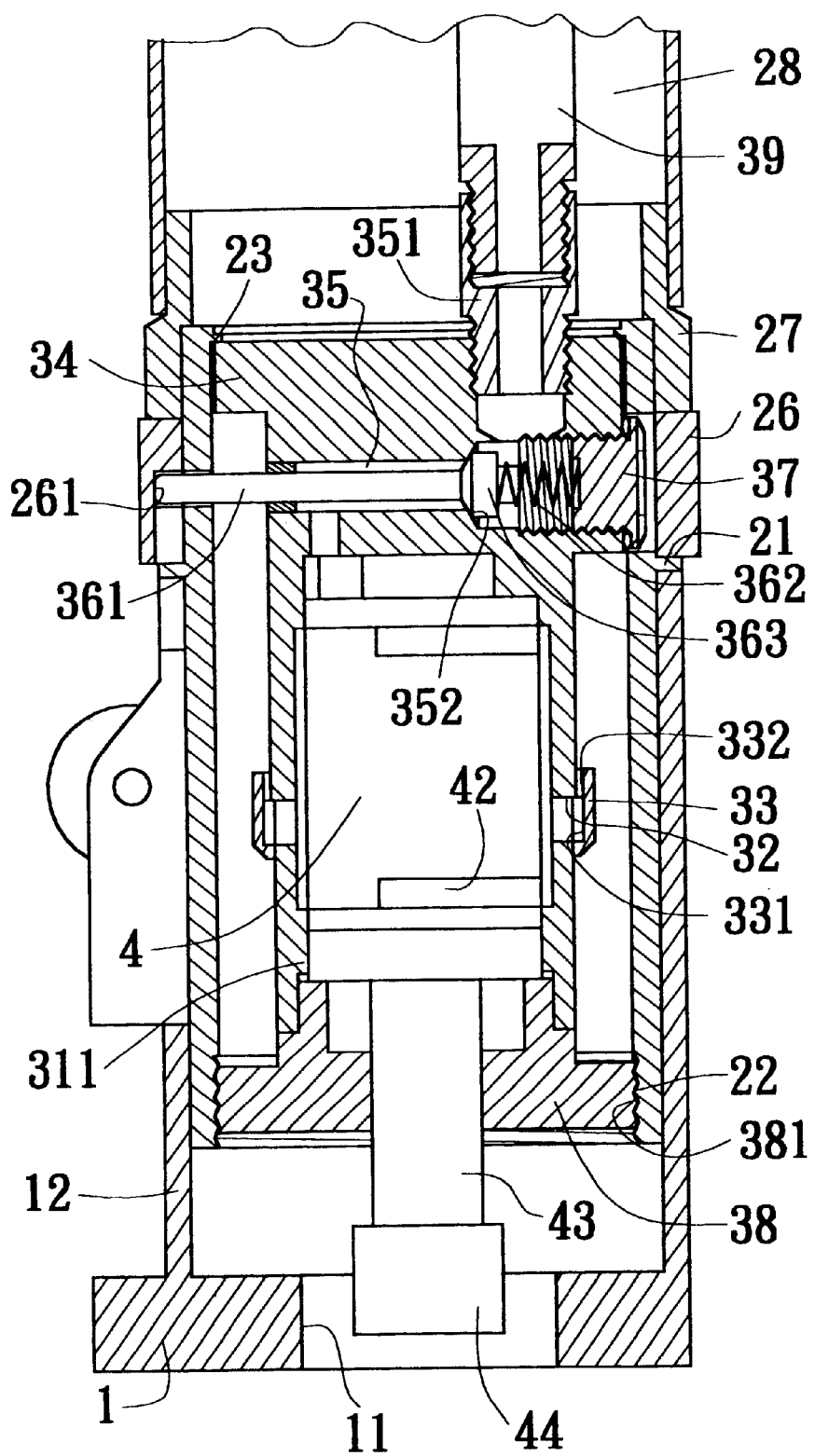
FIG. 3 is a cross section view along line III—III of FIG. 1.

Referring to FIGS. 1 to 3, the pneumatic edge trimming machine of the present invention is illustrated. The pneumatic edge trimming machine of the present invention includes a base 1. The center of the base 1 is a hole 11. A sleeve 12 is extended from the base 1 for receiving a casing 2. The sleeve 12 has a slot 13. Two sides of the slot 13 each have a protrusion 14. Between the two protrusions 14 has a penetrating hole 15. A nut 16 is coaxially installed in the penetrating hole 14 on the base 1. A stud 17 passes through the penetrating hole 15 of another protrusion 14 to be screwed into the nut 16. Thereby, the sleeve 12 is tightly engaged so that the casing 2 receives in the sleeve 12 is clamped.

The casing 2 has a top 201 and a lower end 202. The top 201, lower end 202 of the casing 2 are penetrated. The top 201 has a stopping edge 21. The lower end 202 has an inner thread 22. The top 201 has an inward concave flange 23. The interior of the casing 2 is installed with an inner casing 3. The inner casing 3 has a top 301 and a lower end 302. The inner casing 3 near the top 301 has a rear support frame 34 so that as the inner casing 3 is placed in the outer casing 2, it is supported by the rear supporting frame and is stopped at the flange 23 of the outer casing 2. A front supporting frame 38 with an outer thread 381 is screwed from the front end to resist at a front edge of the inner casing 3 so that the inner casing 3 supports and resists against the outer casing 2 by the supporting frames 34 and 38. Therefore a space between the outer casing 2 and the inner casing 3 penetrates the two ends.

A space for installing a pneumatic motor 4 is formed in the interior of the inner casing 3. A rear end of the pneumatic motor 4 has an air inlet 41 and the front section thereof has a vent 42. The spindle 43 of the pneumatic motor 4 extends forwards to have a knife combining portion 44. The space 31 in the inner casing 3 for receiving pneumatic motor 4 has a stopping ring 311 for tightly engaged with the periphery of the front section of the pneumatic motor 4 so that the inner edge of the inner casing 3 correspondent to the vent 42 of the pneumatic motor 4 has a plurality of via holes 32 penetrating to the outer edge of the inner casing 3. The outer edge of the inner casing 3 has a ring 33 with respective to the via holes 32. The inner edge of the ring 33 has an annular groove 331. The surface of the ring 33 facing to the pneumatic motor 4 has a plurality of vents 332.

The interior of the rear end of the inner casing 3 has an air channel 35. One end of the channel 35 extends to the rear end of the inner casing 3 and is installed with an air tap 351 for being connected to an air inlet tube 39. Another end thereof extends to the interior of the inner casing 3 to be connected to the air inlet 41 of the pneumatic motor 4. A middle section of the channel 35 is installed with a plug 36.

One end of the plug 36 is a rod 361 which exposes from the outer side of the inner casing 3. Another end thereof is screwed with a retainer 37 from the outer edge of the inner casing 3 to resist against a spring at another end of the plug 36 so that the plug portion 363 at the middle section of the plug 36 resists against the taper surface 352 of the channel 35 for isolating the air from the air tap 351 to the pneumatic motor 4.

An protruding portion of the outer casing 2 with respective to the rod 361 of the inner casing 3 and the retainers have a through hole 24 and a hole 25 so that the rod 361 may protrude out of the outer casing 2 and to cause the retainer 37 to be locked to the inner casing 3 from the hole 25. An outer edge of the outer casing 2 with respective to the rod 361 has a rotary ring 26. An inner edge of the rotary ring 26 has a groove 261. The groove serves to receive the protruded portion of the rod 361. One end of the groove is deeper, while another end is shallow to be formed as a slope. Therefore as the rotary ring 26 is rotated, the groove 261 will resist against the rod 361. The rear side of the rotary ring 26 is engage with an outer cover 27 which cause a tube 28 to be connected to a predetermined space (for dust accumulator, etc.).

Figure 4:
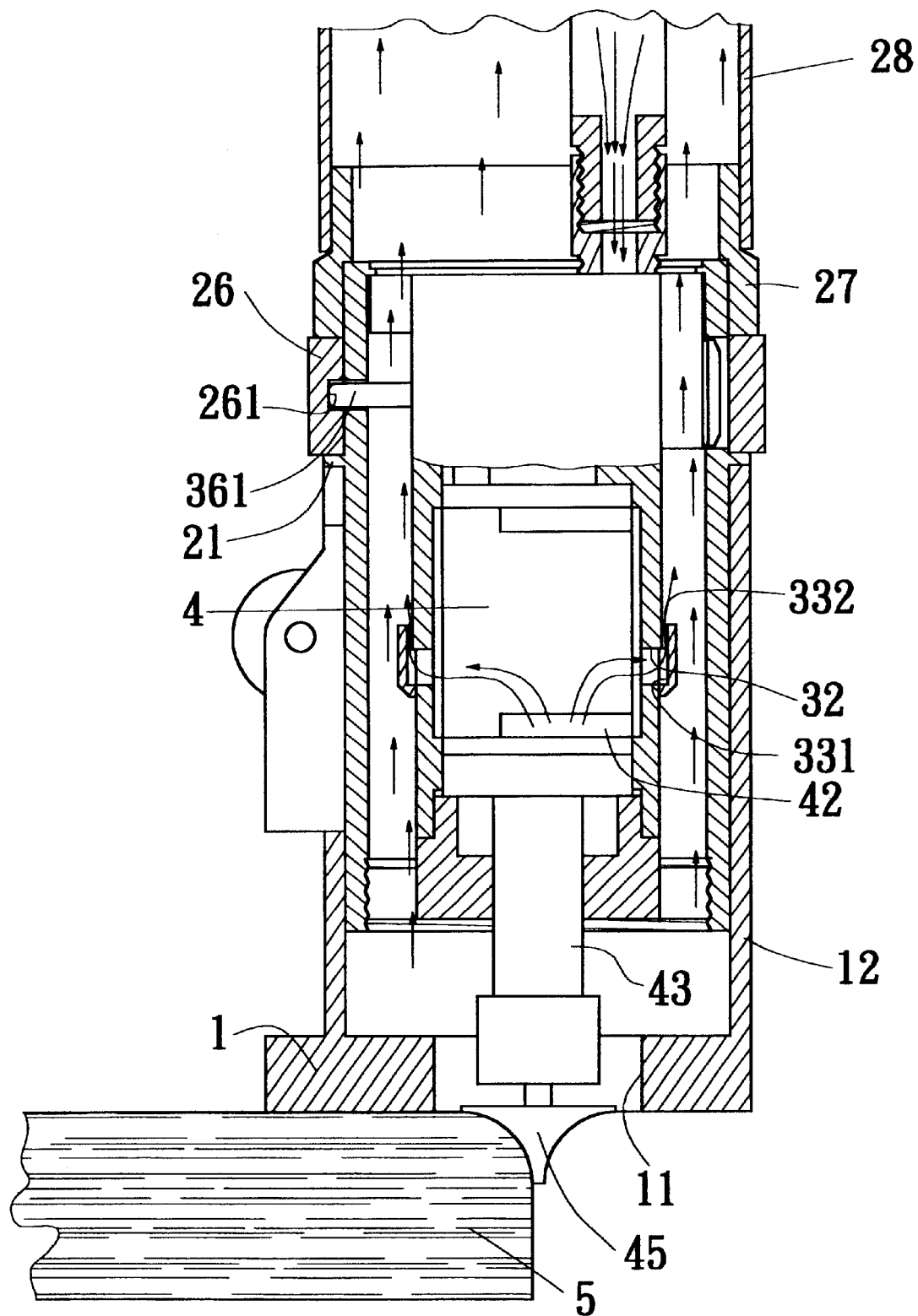
FIG. 4 is a schematic view showing that the present invention is utilized in absorbing dust.
Figure 5:
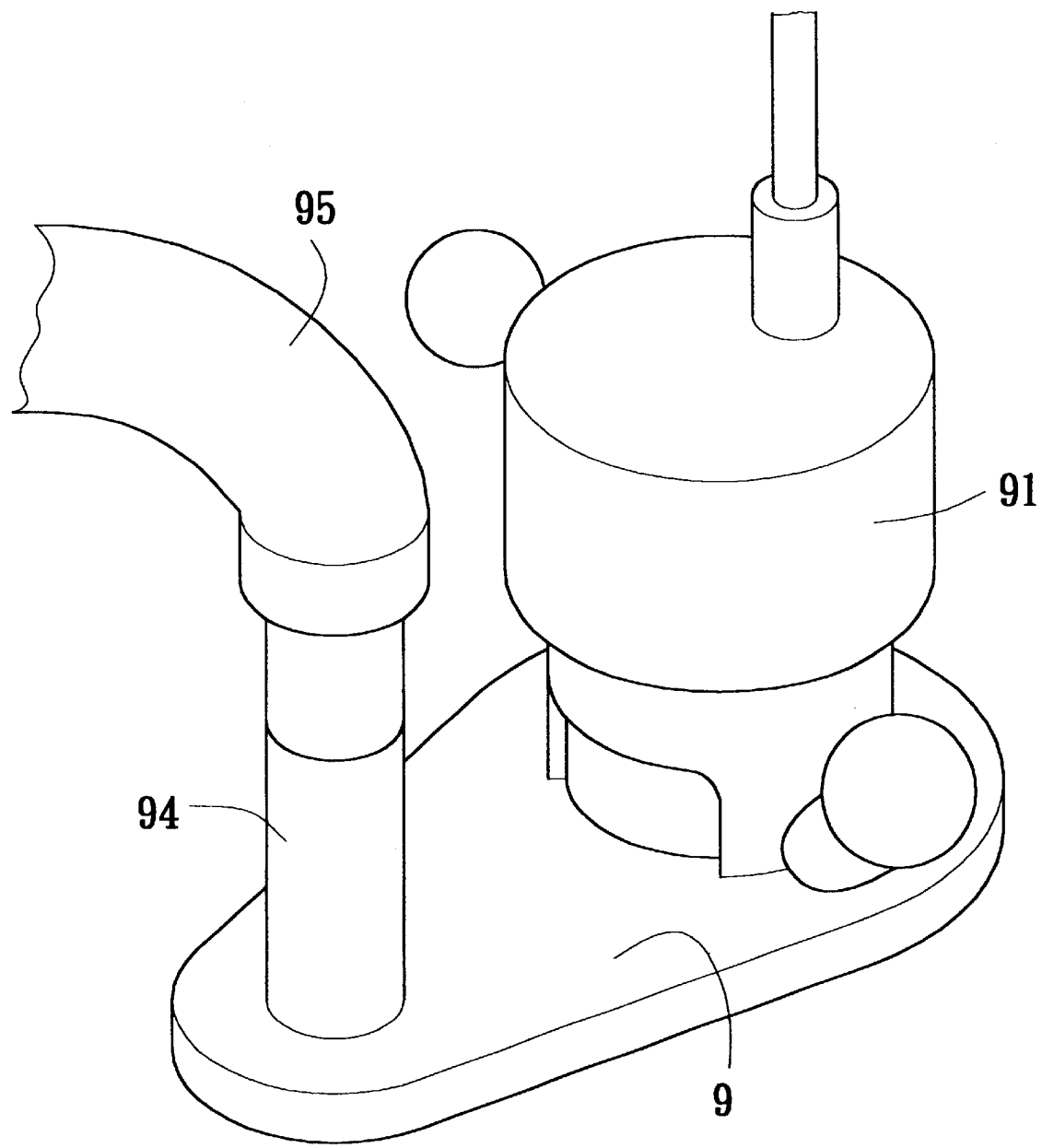
FIG. 5 is a perspective view of a prior art electric edge trimming machine.
Figure 6:
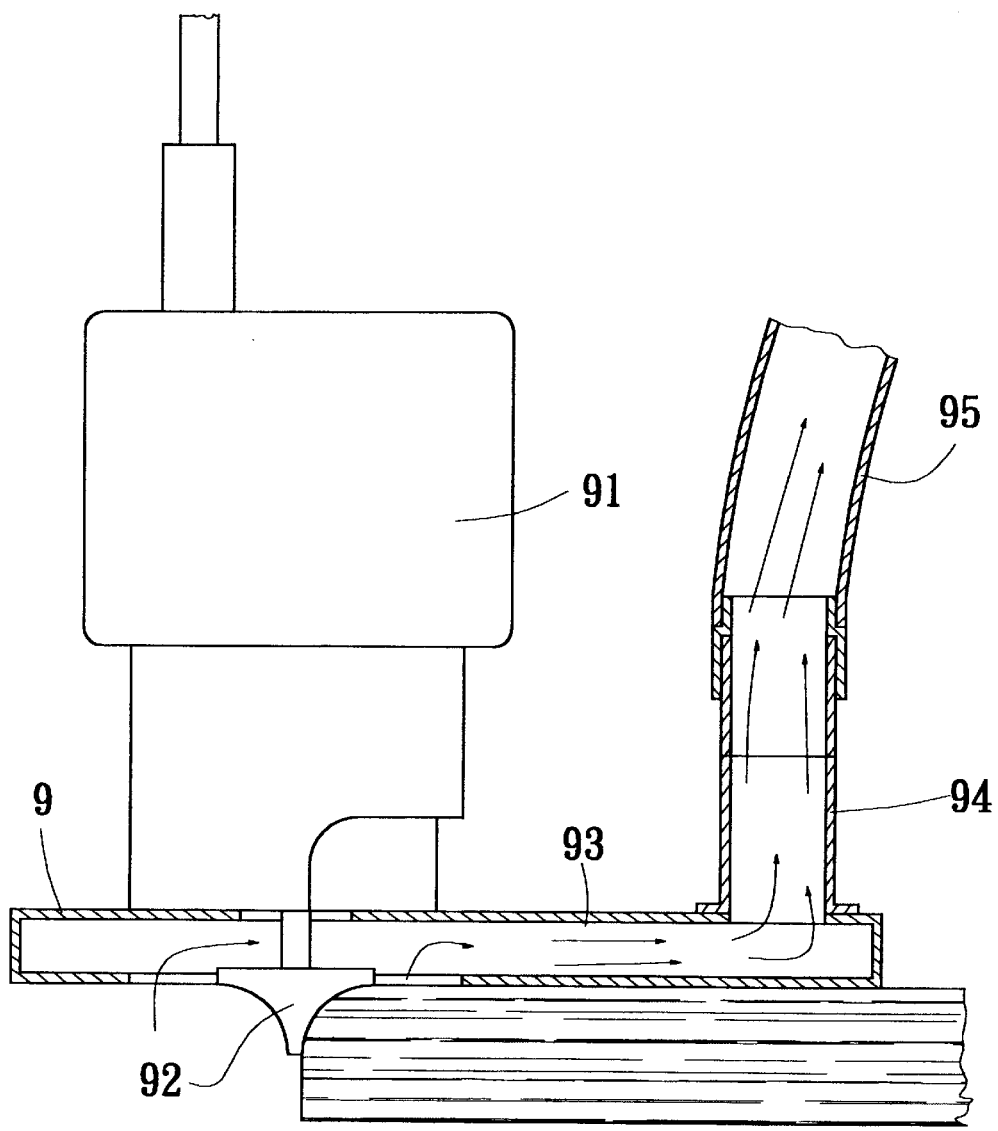
FIG. 6 is a schematic view showing that a prior art electric edge trimming machine is used to absorb dust.

Referring to FIG. 4, in using, the rotary ring 26 is rotated to cause the groove 261 in the rotary ring 261 resists against the rod 361 of the plug 36 so that the plug 363 releases from the taper surface 352 of the channel 35, thereby, air flowing to the air inlet 41 of the pneumatic motor 4 to push the pneumatic motor 4 to rotate and then the air is exhausted from the vent 42 and then flows through the via hole 32, annular groove 331 to be vented out from the rear side of the air vent 332. Since a space penetrates through the outer casing 2 and inner casing 3, the exhausted air will drive air to flow rearwards. Thereby, the dust as a knife 45 cuts a work piece 5 will be absorbed rearwards and then flows through a tube 28 at the outer cover 27 to a preset space (such as dust accumulator, etc.).

Since the place generating an absorbing force is relatively near the work piece 5 of the knife 45, the dust is strongly absorbed. The flow from the work piece 5 of the knife 45 to the tube 28 through the inner casing 3 and outer casing 2 are smooth. Therefore the effect of absorbing dust is high.

The heat from the operation of the pneumatic motor 4 will be dispersed by the flowing air, and therefore no overheat occurs so as to retain a proper working temperature and thus the working efficiency is increased.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A pneumatic edge trimming machine, comprising a base and a hole centrically defined in the base, a sleeve extending upwards from the base for receiving a hollow outer casing that has a top end and a lower end opposite to the top end of the hollow outer casing, the top end and the lower end of the outer casing being fixed to an inner casing through a frame such that a space is formed between the outer casing and the inner casing, the space extending from the lower end of the outer casing to the top end of the outer casing, a pneumatic motor received in the inner casing and having a shaft extending from the pneumatic motor, a tool combining portion formed on a free end of the shaft and separately received in the hole in the base, the pneumatic motor having an air inlet defined in a top of the pneumatic, the inner casing having a vent defined to face toward the top end of the outer casing, the top end of the outer casing adapted to be connected to a predetermined space by a tube.

2. The pneumatic edge trimming machine as claimed in claim 1, wherein the inner casing has a plurality of via holes laterally extending through the inner casing and communicating with the vent of the pneumatic motor; a ring is disposed around the inner casing and corresponds to the via holes of the inner casing; an annular groove is defined in the ring and communicated with the via holes in the inner casing; and a plurality of vents is defined in a surface of the ring and extends to communicates with the via holes in the inner casing.

3. The pneumatic edge trimming machine as claimed in claim 1, wherein the lower end of the outer casing comprises an inner threaded formed in an inner periphery of the outer casing and the top end of the outer casing comprises a concave flange radially inwards extending from an inner periphery of the outer casing, an interior of the outer casing being installed with an inner casing, the inner casing having a further top and a further lower end, the inner casing near the further top has a rear support frame so that as the inner casing is placed in the outer casing, it is supported by the rear supporting frame and is stopped at the flange of the outer casing, a front supporting frame with an outer thread being screwed from a front end to resist at a front edge of the inner casing so that the inner casing supports and resists against the outer casing by the front and rear supporting frames, therefore a space between the outer casing and the inner casing penetrates two ends.

4. The pneumatic edge trimming machine as claim in claim 1, wherein an interior of a top of the inner casing has an air channel, one end of the channel extending to a rear end of the inner casing and installed with an air tap for being connected to an air inlet tube and another end of the channel extending to an interior of the inner casing to be connected to the air inlet of the pneumatic motor, a middle section of the channel installed with a plug, one end of the plug extending through the inner casing and another end of the plug screwed with a retainer from an outer edge of the inner casing to resist against a spring at another end of the plug so that the plug portion at a middle section of the plug resists against a taper surface of the channel for isolating air from the air tap to thee pneumatic motor.

5. The pneumatic edge trimming machine as claimed in claim 1, wherein a protrusion portion of the outer casing corresponding to the rod of the inner casing and the retainers have a through hole and a hole so that the rod is protruded out of the outer casing and to cause the retainer may be locked to the inner casing from the hole, an outer edge of the outer casing having a rotary corresponding to the rod, an inner edge of the rotary ring having a groove provide to receive the protruded portion of the rod, one end of the groove being deeper when another end of the groove is shallow to be formed as a slope, therefore as the rotary ring is rotated, a groove will resist against the rod, a rear side of the rotary ring engaged with an outer cover for stopping a rear edge of the rotary ring.

* * * * *